(12) United States Patent  
McAdoo

(10) Patent No.: US 7,097,722 B2
(45) Date of Patent: Aug. 29, 2006

(54) METHOD OF SEAMING LINOLEUM

(75) Inventor: Timothy W. McAdoo, Landisville, PA (US)

(73) Assignee: AWI Licensing Company, Wilmington, DE (US)

( * ) Notice: Subject to any disclaimer, the term of this patent is extended or adjusted under 35 U.S.C. 154(b) by 168 days.

(21) Appl. No.: 10/443,275

(22) Filed: May 21, 2003

(65) Prior Publication Data

US 2003/0235697 A1 Dec. 25, 2003

Related U.S. Application Data

(60) Provisional application No. 60/382,424, filed on May 22, 2002.

(51) Int. Cl.
E04F 15/16 (2006.01)
B32B 31/12 (2006.01)
B32B 31/18 (2006.01)
B29C 65/54 (2006.01)

(52) U.S. Cl. .................. 156/71; 156/258; 156/266; 156/267; 156/304.1; 52/403.1; 52/746.1

(58) Field of Classification Search ................ 156/71, 156/250, 258, 266, 267, 304.1, 304.7; 52/403.1, 52/746.1; 428/456, 542
See application file for complete search history.

(56) References Cited

U.S. PATENT DOCUMENTS 1,726,215 A  8/1929 De Both
3,464,178 A  9/1969 Deichert et al. ............... 52/309
4,260,273 A * 4/1981 Hemperly et al. ............ 401/48
4,484,976 A  11/1984 Despins ....................... 156/578
4,543,765 A  10/1985 Barrett ......................... 52/747
4,546,024 A  10/1985 Brown ......................... 428/44
4,648,181 A  3/1987 Fortin .......................... 30/293
4,817,963 A  4/1989 Munden et al. ................. 277/1
5,250,145 A  10/1993 Despins et al. ............. 156/578
5,257,491 A  11/1993 Rouyer et al. ................ 53/428
5,721,302 A * 2/1998 Wood et al. ................. 524/271
5,981,035 A * 11/1999 Eshleman .................... 428/194
6,122,890 A  9/2000 Pollitt ...................... 52/747.11
6,427,569 B1  8/2002 MacDonald ................... 83/13
6,528,563 B1  3/2003 Kaiser et al. ................ 524/239
6,574,933 B1  6/2003 Devlin ..................... 52/396.05

FOREIGN PATENT DOCUMENTS

GB  2 037 654  7/1980
JP  04180983 A * 6/1992

OTHER PUBLICATIONS

English abstract of JP 04–180983.*

* cited by examiner

Primary Examiner—Chris Fiorilla
Assistant Examiner—Sing P. Chan
(74) Attorney, Agent, or Firm—Douglas E. Winters

(57) ABSTRACT

Disclosed is a method of joining at least two linoleum sheets. The method includes creating a seam between the linoleum sheets and forming a bead of non-epoxy adhesive on a seam edge or injecting the non-epoxy adhesive into a closed seam. The seam formed by the edges of the linoleum sheets is joined and filled with the adhesive. Excess adhesive is removed and the seam is rolled and the seam adhesive is limited to the area between the linoleum sheets and the substrate within one linoleum sheet thickness of the seam.

11 Claims, 4 Drawing Sheets

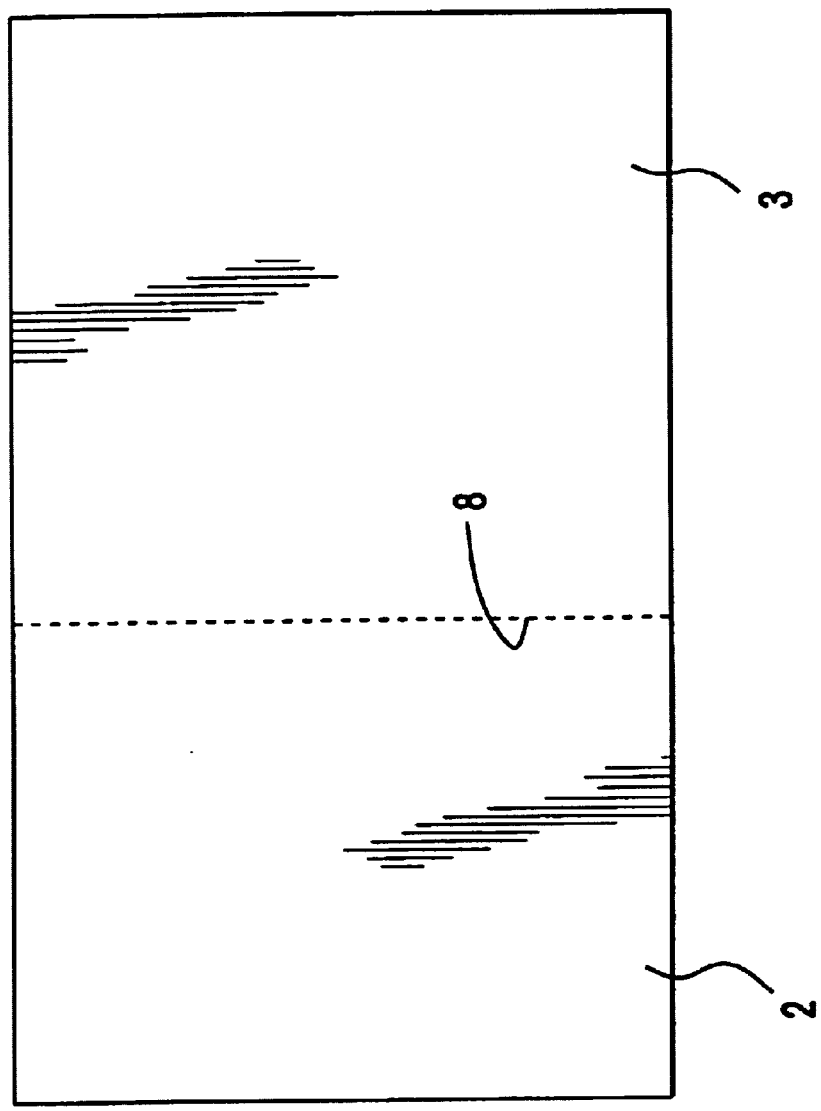

METHOD OF SEAMING LINOLEUM

REFERENCE TO RELATED APPLICATION

This application claims the benefit of the filing date of U.S. Provisional Patent Application Ser. No. 60/382,424 filed on May 22, 2002, which is incorporated herein in its entirety.

TECHNICAL FIELD

The present invention relates to a system for seaming linoleum sheets and to a substantially visually seamless flooring system and more specifically to a system for joining at least two linoleum sheets using a non-epoxy adhesive, including acrylic adhesives and ethylene vinyl acetate adhesives, for bonding the sheets to form a substantially visually seamless flooring system.

BACKGROUND

Decorative coverings, such as floor coverings, include linoleum sheets. Linoleum sheets are typically affixed onto a sub-flooring using an adhesive. When the sheets are joined, a seam or joint is formed. Such seam is often unsightly and prone to collecting dirt, thus it is often desirable to seal the seam using various methods.

When abutting flooring sheets are seamed together and glued in place, the seam often degrades over time as the seam is exposed to traffic, moisture, cleaning chemicals, and dirt. Contamination eventually penetrates the seam and degrades the adhesive holding the floor sheets to the floor at the seam. When the adhesive degrades, the floor sheet will lift from the floor at the seam, lending the seam an unsightly puckered appearance and making the seam more vulnerable to further damage. In order to repair the damaged portion of the seam, it is usually necessary to carefully cut out and replace it with a fresh patch of matching material. The patch must match the removed portion's pattern and shape perfectly, or the repair will be visible.

Linoleum has been seamed by laying the vertical side edges of adjacent layers in close abutment, folding back the adjacent marginal portions of the floor covering layers to expose the sub-floor, applying an epoxy adhesive to the sub-floor along the line of abutment using a spatula-like tool called a "spread," and then bringing the marginal portions back down onto the sub-floor, and hand-rolling the seam to complete the operation.

The epoxy was applied to the sub-floor in a band that is several thicknesses of the flooring material wide on each side of the seam, and the flooring material is then pressed onto the sub-floor. Some of the epoxy is forced into the seam to bond the flooring materials together. The seam bond between the epoxy and the flooring materials, however, is not waterproof. The bond between the epoxy and the flooring material is relatively weak because the epoxy is much stiffer than the flooring material. The bond between the two often breaks under traffic.

Current recommended practice for installing linoleum in commercial applications involves "heat welding" the seams and, for residential applications, linoleum seams are merely butted together.

Thus, what is needed is a method for joining seams formed by abutting edges of adjacent linoleum sheets that will not degrade, appear substantially visually seamless and form a substantially gap free seam between the adjacent linoleum sheets.

SUMMARY

The present invention comprises a method of joining at least two linoleum sheets. Typically, the linoleum sheet is a surface covering bonded to a substrate such as a sub-floor. The method includes creating a seam or joint between the linoleum sheets and placing a bead of a non-epoxy adhesive on the vertical edge of one of the linoleum sheets or injecting the non-epoxy adhesive into the seam between the vertical edges of the linoleum sheets forming the seam. Therefore, the seam is filled with the adhesive from the bead of adhesive or the injected adhesive. Any excess adhesive may then be removed and the seam rolled.

Additionally, a substantially visually seamless linoleum flooring system is provided comprising at least two linoleum sheets. The system includes a first linoleum sheet having a first seam edge and a second linoleum sheet having a second seam edge. The linoleum sheets are typically secured to a substrate. An adhesive different than the adhesive used to form the seam is used to adhere the linoleum sheets to the substrate.

The seam is formed by the meeting of the first seam edge and the second seam edge. The seam is filled with a non-epoxy adhesive. Excess adhesive that exudes out of the seam adjacent the exposed major surface of the linoleum sheets is usually wiped off.

Since the non-epoxy adhesive is clear, flexible and resistant to moisture penetration, the flooring system appears to be substantially seamless. Further, since the seam adhesive is relatively expensive, the seam adhesive is applied to the seam only. Any seam adhesive that exudes out of the seam and between the linoleum sheets and the substrate is limited to the area between the linoleum sheet and the substrate within one linoleum sheet thickness of the seam.

A further embodiment includes a method of joining linoleum sheets including cutting the selvage edge from a first linoleum sheet to form a first seam edge. A second linoleum sheet having a second seam edge formed by removing the selvage edge is place alongside the first linoleum sheet. A non-epoxy adhesive is applied along the first seam edge and the edges are then joined to form a seam. The seam is filled with the adhesive. The excess adhesive, which flows from the seam, may be removed and the seam then rolled with a weighted roller.

An additional embodiment includes a method of joining a linoleum sheet comprising the steps of adhering adjacent linoleum sheets to a substrate, trimming the linoleum sheets to form a seam between the sheets, and adhering the sheets to a substrate with an adhesive different from the non-epoxy adhesive used to join the sheets to each other. The non-epoxy adhesive is injected into the seam formed between the adhered adjacent sheets with, for example, a needle applicator before or after the sheets and seam are rolled. Tools that are inserted into the seam and bend the adjacent edges of the sheets are avoided to deter creasing or otherwise damaging the linoleum sheets.

A further embodiment of a method of joining linoleum sheets includes applying an adhesive to the substrate over an area on which a first linoleum sheet and a second linoleum sheet will be laid. The first linoleum sheet is adhered to the substrate by rolling a weight over the first linoleum sheet, including adjacent the edge to be seamed. The edge of the first linoleum sheet to be seamed may be trimmed before or after the first linoleum sheet is laid on the adhesive covered substrate. If the first linoleum sheet is trimmed after the sheet is laid on the adhesive, it is before the area adjacent the seam is rolled.

A next step includes positioning a second linoleum sheet adjacent to the first linoleum sheet such that a second seam edge of the second sheet overlaps the first seam edge of the first sheet and adhering the second sheet to the sub-floor with an adhesive. The second sheet is laid on the adhesive and while a majority of the sheet may be rolled, the area adjacent the overlay, such as within twelve inches of the edge of the first sheet is not rolled.

Then a recess may be scribed into the overlapped edge of the second sheet and the overlapping portion removed from the second sheet. As the recess is scribed a portion of the adhesive that was applied to the substrate adjacent the first seam edge is removed. Therefore, the seam is not bound directly to the substrate and retains some of its flexibility, helping to maintain the substantially visually seamless appearance of the seam.

Next a bead of non-epoxy adhesive is applied along the seam edge of one of the sheets. Then the edges of the sheets are joined with the bead of adhesive interposed between the seam edges filling the resulting seam. The adhesive residue from the surface of the linoleum sheets may then be cleaned. Finally, the seam may then be rolled.

DRAWINGS

In the drawings:

FIG. 4 depicts the substantially visually seamless flooring system comprised of a first and second linoleum sheet.

DETAILED DESCRIPTION

Figure 1:
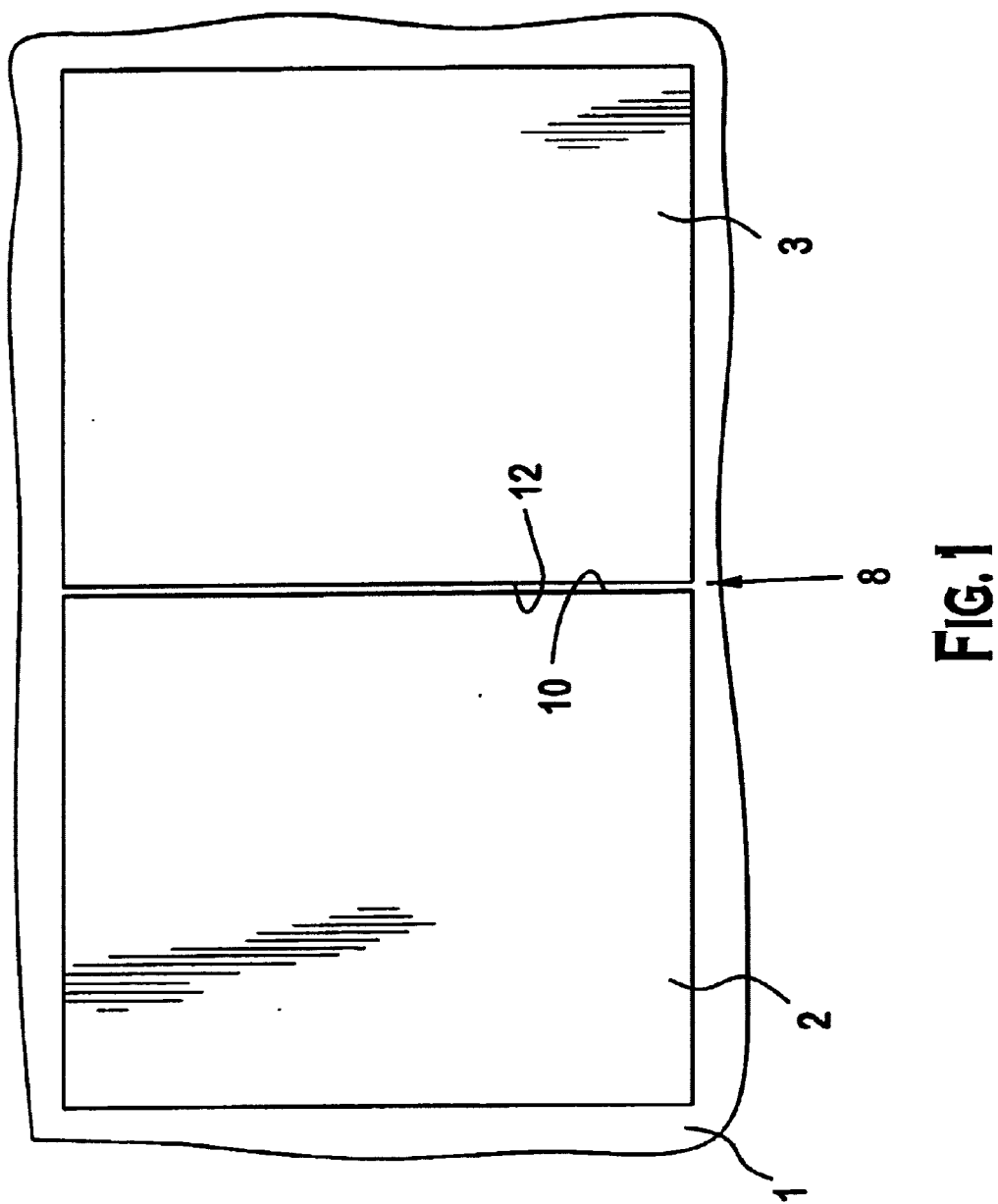
FIG. 1 depicts a pair of linoleum sheets having a seam formed between the sheets when the two sheets are brought together and adhered to a substrate.

The present invention comprises a method of joining at least two linoleum sheets to form a substantially visually seamless flooring system. The method includes creating a seam or joint between the linoleum sheets and placing a bead of non-epoxy adhesive in the seam. The seam is defined by the edges of the linoleum sheets. The edges of the linoleum sheets forming the seam are brought together or joined with the bead of non-epoxy adhesive having been applied to a seam edge or the seam is filled with the non-epoxy adhesive by injecting the adhesive into the seam formed by the adjacent edges. Excess adhesive exuded from the seam may then be removed and the seam rolled. A substantially visually seamless flooring system is thus formed by the joined linoleum sheets having a non-epoxy adhesive filling the seam to give the appearance of a seamless seam.

Non-epoxy adhesives acceptable for use in the present system for joining linoleum sheets include most any non-epoxy adhesive that provides acceptable bond strength to keep the bonded linoleum sheets together when installed. Epoxy adhesives are not included in the category of acceptable adhesives for use in the present system since epoxy adhesives form a seam lacking the desired strength, flexibility and ability to be cleaned. Water based systems can be used in one embodiment, but other solvents are contemplated along with 100% solids systems. The viscosity of the non-epoxy adhesive is sufficiently high to maintain the adhesive in position in the seam area until pressure is applied. Another characteristic of the adhesive is that it is capable of providing adequate adhesion and strength to keep the integrity of the seam in tact when exposed to normal wear and tear after installation.

The term "substantially visually seamless" includes the appearance that the joined linoleum sheets are one continuous sheet. Of course, the visual effect is dependent upon the similarities of the joined linoleum sheets. Additionally, "substantially visually seamless" includes a flooring system having no visible seam or seam. Such a substantially visually seamless seam is capable of preventing dirt or other particles from being trapped in the joint formed by the meeting of the two sheets.

The term "seam" delineates the area between the two abutting linoleum sheets. The "seam" includes the area created between the two linoleum sheets once they are brought together in the finished flooring system, the vertical edges of the linoleum sheets between the major surfaces of the sheets and the non-epoxy adhesive.

The term "open seam" is intended to describe the condition of the adjacent linoleum sheets when one or both of the seam edges and portion of the major surface of the linoleum sheet adjacent the one or both seam edges are raised away from the substrate.

The term "closed seam" is intended to describe the condition of the adjacent linoleum sheets when the portion of the major surface of both linoleum sheets adjacent the seam edges are also adjacent the substrate. The portion of the major surface adjacent the seam edge may or may not be adhered to the substrate. The seam edges are proximate and substantially parallel to each other, i.e. parallel or nearly parallel to each other.

An example of an acceptable adhesive for joining the linoleum sheets includes S-761 adhesive, a latex based ethylene vinyl acetate adhesive available from Armstrong World Industries, Inc. of Lancaster, Pa. Acrylic adhesives are also acceptable.

Referring now in more detail to the drawings, in which like numerals refer to like parts throughout the several views. In FIGS. 1–4, both the method of sealing linoleum sheets and the substantially visually seamless flooring system are depicted.

The method of joining linoleum sheets (2 and 3) may include cutting linoleum sheets 2 and 3, shown in FIG. 1, to form vertical seam edges 10 and 12 interposed between the major surfaces of the linoleum sheets. The seam 8 is formed by laying the linoleum sheets 2 and 3 on the substrate 1 and locating the first seam edge 10 of first linoleum sheet 2 adjacent the second edge 12 of second linoleum sheet 3. A bead of non-epoxy adhesive 6 is placed on one of the vertical edges of the linoleum sheets or within the seam 8.

The seam 8 is further formed as the seam edges 10 and 12 of the seam are brought together and the bead of non-epoxy adhesive 6 fills the void in the seam 8 created by the meeting of a first seam edge 10 of first linoleum sheet 2 and a second edge 12 of second linoleum sheet 3. The adhesive is exuded and forced up through the seam as the two seam edges 10 and 12 are brought together and the linoleum sheets 2 and 3 rest in substantially the same plane. Typically, once the excess exuded adhesive 6 is removed from the seam 8, the adhesive is no longer visible in the seam. Furthermore, when the linoleum sheets 2 and 3 are joined, there is substantially no gap therebetween giving the appearance of a substantially visually seamless flooring system.

Figure 2:
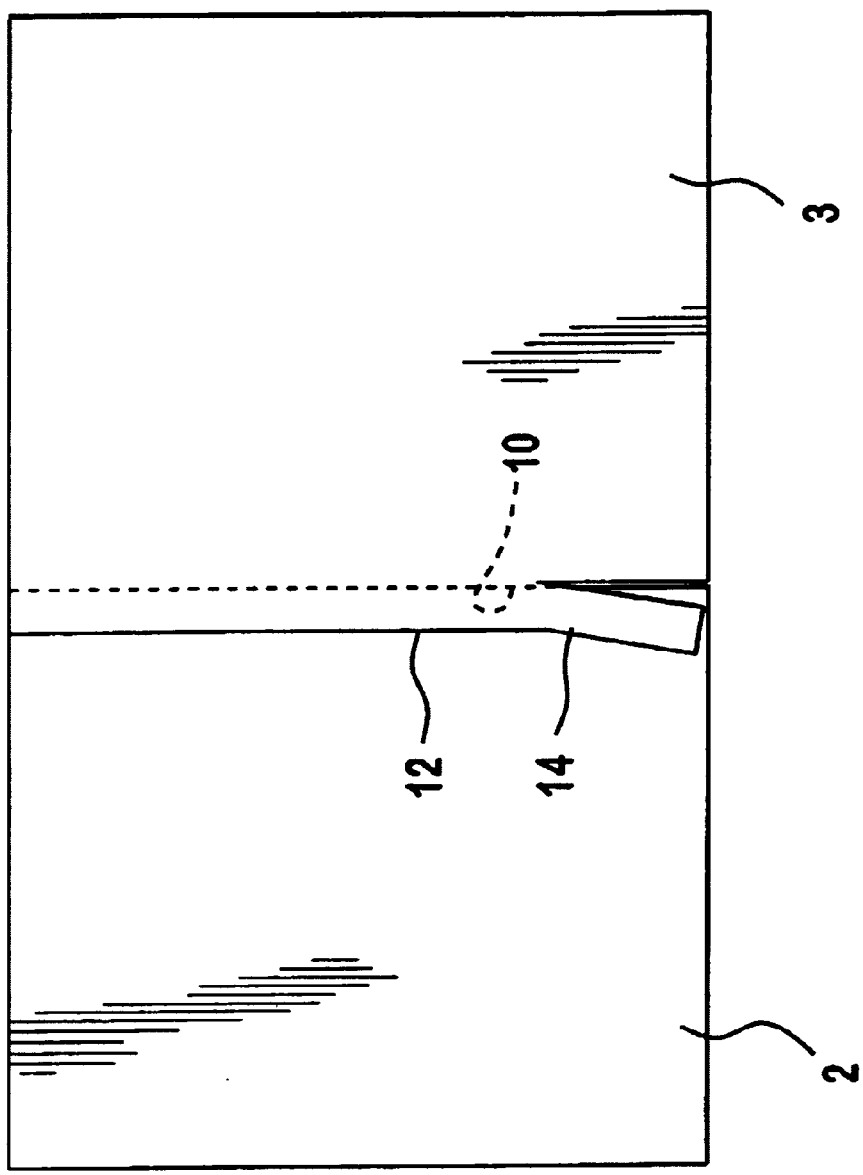
FIG. 2 illustrates a first linoleum sheet overlapping a second sheet with a portion of the overlapping sheet removed.
Figure 3:
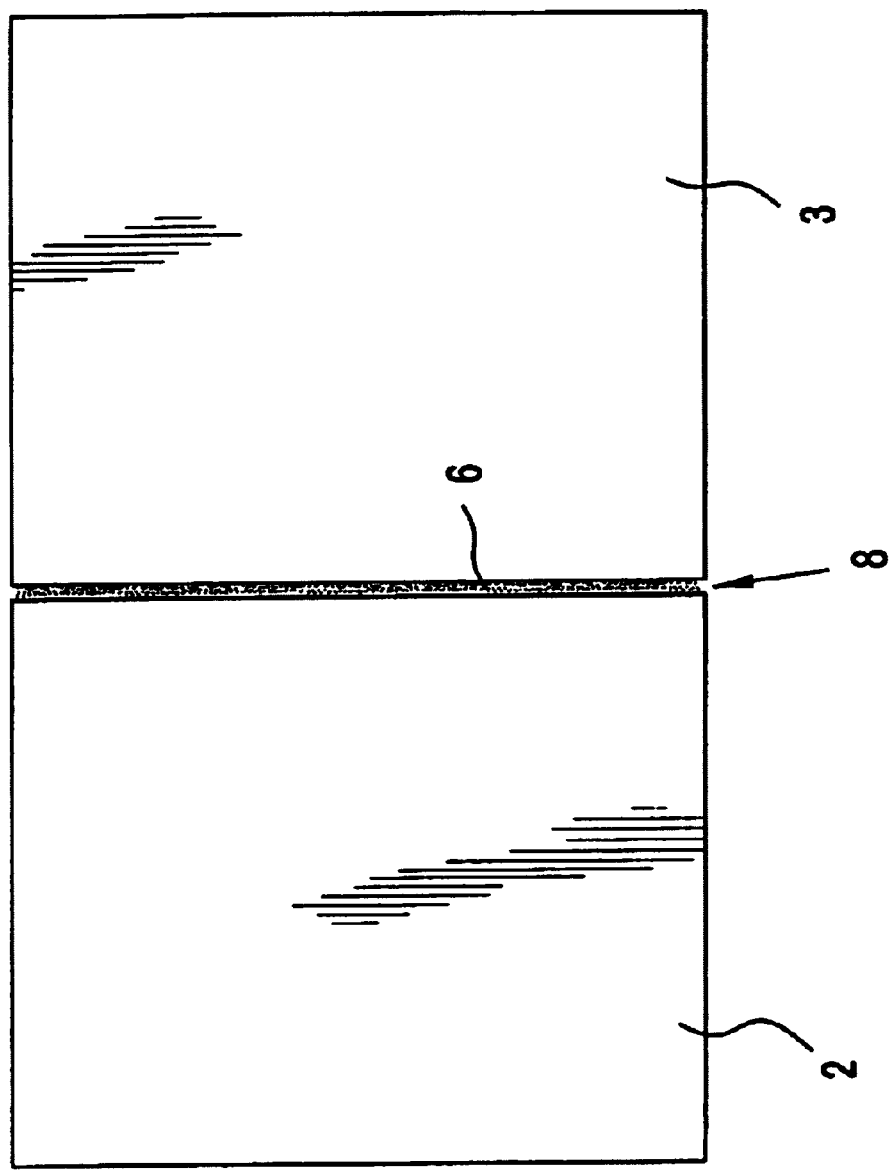
FIG. 3 illustrates a pair of linoleum sheets having a seam formed between the sheets when the two sheets are brought together including a non-epoxy adhesive filling the seam.

In further detail, the method of joining a linoleum sheet includes adhering first and second linoleum sheets 2 and 3 to a substrate 1 as is illustrated in FIG. 1. The second linoleum sheet 3 is placed adjacent to the first linoleum sheet 2 such that a second seam edge 12 of the second sheet 3 overlaps the first seam edge 10 of the first sheet 2 as illustrated in FIG. 2. A recess is then scribed in the overlapped edge portion 14 of the second sheet 3, and the overlapping portion 14 can then be cut away and removed. A bead of non-epoxy adhesive 6 is applied along the first seam edge 10 of the first sheet 2 in one embodiment. In another embodiment, the bead of adhesive 6 is applied along the second seam edge 12 of the second sheet 3. The edge 12 of the second sheet 3 may then be joined against the edge 10 of the first sheet 2. The adhesive is then exuded and forced up through the resulting seam 8 as shown in FIG. 3. Any excess can be cleaned away and the seam 8 can then be rolled.

Additionally, before forming the seam 8, the abutting edges 10 and 12 of adjacent first and second linoleum sheets 2 and 3 can be trimmed and adhered to the sub-floor with an adhesive such that the edge 12 of the second sheet 3 overlaps the edge 10 of the first sheet 2 by about ½ inch to 1 inch as further illustrated in FIG. 2. The overlap may be greater or less than the recited dimensions.

In forming the seam 8, the process can comprise in further detail the steps of starting at the center of the linoleum sheet 2 and working toward the edges of the sheets and rolling the sheets 2 and 3 in two directions using about a 100 pound roller. The roller can be most any weight so long as the flooring is adequately adhered to the sub-floor. The linoleum sheet 2 can be fully rolled and adhered to the substrate 1, even adjacent the seam edge 10.

Typically, the linoleum sheet 3 is rolled while avoiding the seam 8 formed by the edges of the sheets. Typically, the roller stays about 6" to about 12" away from the seam area. A recess scriber, for example an S-83 Recess Scriber which is available from Armstrong World Industries, Lancaster Pa., may be used to recess scribe the seam, with the seam edges touching lightly, followed by inserting a piece of scrap material beneath the scribe mark. The scrap protects the first sheet 2 during the cutting process.

Next a ⅛" bead of S-761 Adhesive is applied along the seam edge of either the first linoleum sheet 2 or the second linoleum sheet 3. The bead of adhesive 6 may be of most any dimension, since any excess will be removed later. The bead of adhesive 6 can be applied using an applicator bottle. The seam edge may then be tucked into place, forcing the adhesive up through the seam. The excess exuded adhesive residue can be removed from the surface of the linoleum sheets 2 and 3., using a cloth dampened with a neutral detergent and water. Then the seam is rolled using a hand held roller or similar tool, and then rolled again with about a 100 pound roller.

Additionally, the joining process may be part of a complete process for installing multiple coverings of linoleum sheets on a substrate 1 to complete a flooring system forming a substantially visually seamless floor as illustrated in FIG. 4. The substantially visually seamless flooring system includes at least two linoleum sheets 2 and 3 combined to form a substantially visually seamless floor covering that has the appearance of a homogenous floor covering. The system includes a first linoleum sheet 2 having a first seam edge 10 and a second linoleum sheet 3 having a second seam edge 12 secured to the substrate 1. A seam 8 is formed by the meeting of the first seam edge 10 and the second seam edge 12. The seam 8 is filled with a non-epoxy adhesive. The non-epoxy adhesive 6 fills the seam 8 to a level flush with the linoleum sheets 2. Any adhesive 6 that is exuded between the linoleum sheets 2 and 3 and the substrate 1, remains within a thickness of the linoleum sheet of the seam. Typically, the non-epoxy adhesive 6 is not visible in the seam 8, thus giving the appearance of being substantially seamless.

The floor covering can be attached to a substrate 1 comprising concrete, ceramic tile, terrazzo, marble, wood or an existing resilient floor. Of course, most any substantially stable substrate, including plywood and composition hardboard, may be used.

While specific embodiments are set forth as illustrated and described above, it is recognized that variations may be made with respect to the disclosed embodiments. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

What is claimed is:

1. A method of joining two linoleum sheets on a substrate comprising:

positioning a first linoleum sheet on the substrate;

positioning a second linoleum sheet on the substrate adjacent the first linoleum sheet, each linoleum sheet having two major surfaces and a seam edge interposed between the major surfaces of the linoleum sheets, the seam edges being proximate each other;

adhering the linoleum sheets to the substrate with a first adhesive; and applying a second non-epoxy adhesive, different from the first adhesive, to one of the seam edges in the form of a bead while the two adjacent linoleum sheets form an open seam and then forming a closed seam between the two adjacent linoleum sheets, whereby the seam is substantially filled with the non-epoxy adhesive and any of the second non-epoxy adhesive interposed between the linoleum sheets and the substrate is limited to the area within one linoleum sheet thickness of the seam.

2. The method of joining two linoleum sheets of claim 1, wherein the non-epoxy adhesive is latex based.

3. The method of joining two linoleum sheets of claim 1, wherein the non-epoxy adhesive comprises ethylene vinyl acetate.

4. The method of joining two linoleum sheets of claim 1, wherein the non-epoxy adhesive comprises an acrylic adhesive.

5. The method of joining two linoleum sheets of claim 1, wherein excess non-epoxy adhesive is removed from the seam adjacent the exposed major surfaces of the linoleum sheets.

6. The method of joining two linoleum sheets of claim 1, wherein the portion of the major surface of the first linoleum sheet adjacent the seam and distal the exposed major surface is adhered to a substrate prior to forming a bead of non-epoxy adhesive on the seam edge of the first linoleum sheet.

7. The method of joining two linoleum sheets of claim 1, wherein the portion of the major surface of the first linoleum sheet adjacent the seam and distal the exposed major surface is adhered to a substrate prior to forming a bead of non-epoxy adhesive on the seam edge of the second linoleum sheet.

8. The method of joining two linoleum sheets of claim 1, wherein the second linoleum sheet is positioned on the substrate with the seam edge of the second linoleum sheet overlapping the exposed major surface of the first sheet adjacent the seam edge the first linoleum sheet; and wherein the method further comprises trimming the second linoleum sheet and forming an open seam between the two adjacent linoleum sheets.

9. The method of joining two linoleum sheets of claim 8, wherein the overlapped portion of the second linoleum sheet is recess scribed and a portion of the first adhesive adjacent the seam edge of the first linoleum sheet is removed.

10. The method of joining two linoleum sheets of claim 8, wherein the portion of the major surface of the first linoleum sheet adjacent the seam and distal the exposed major surface is adhered to a substrate prior to trimming the second linoleum sheet.

11. The method of joining two linoleum sheets of claim 10, wherein the portion of the major surface of the first linoleum sheet adjacent the seam and distal the exposed major surface is adhered to a substrate and the second linoleum sheet is trimmed prior to forming a bead of non-epoxy adhesive on the seam edge of the first linoleum sheet.

* * * * *